(No Model.)
C. J. VAN DEPOELE.
SUSPENDED ELECTRICAL CONVEYER.
No. 323,984. Patented Aug. 11, 1885.
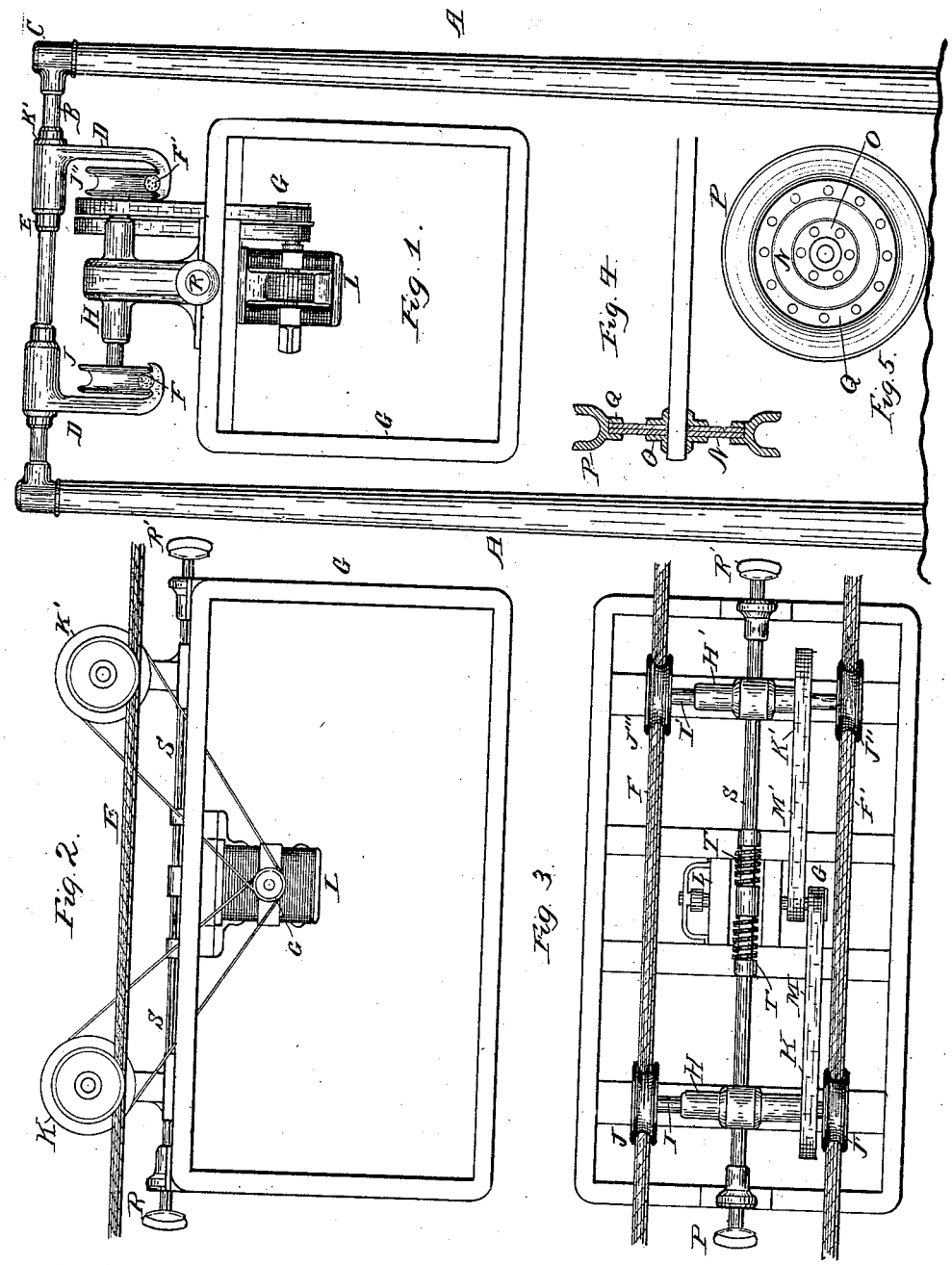
Witnesses
William T. Robertson
E. J. Robertson
Inventor
Charles J. Van Depoele
by T. W. Robertson
Attorney

UNITED STATES PATENT OFFICE.

CHARLES J. VAN DEPOELE, OF CHICAGO, ILLINOIS.

SUSPENDED ELECTRICAL CONVEYER.

SPECIFICATION forming part of Letters Patent No. 323,984, dated August 11, 1885.

Application filed March 10, 1885. (No model.)

*To all whom it may concern:*

Be it known that I, CHARLES J. VAN DEPOELE, a citizen of the United States of America, residing at Chicago, in the county of Cook and State of Illinois, have invented certain new and useful Improvements in Suspended Electrical Conveyers, of which the following is a specification, reference being had therein to the accompanying drawings.

This invention relates to that class of electric railways wherein the cable or support for the car forms the conductor for the electric current used for operating the motor; and the invention consists in the peculiar construction, arrangement, and combinations of parts hereinafter described and claimed.

In the accompanying drawings, Figure 1 represents an end view of a suspended car, the cables, and the supports for the same. Fig. 2 is a side view of a car and the cables for supporting it. Fig. 3 shows a plan of a car and the cables. Fig. 4 shows a section of a wheel and part of the axle; Fig. 5, a side view of the wheel.

Referring to the details of construction, A A represent pillars or posts, of any suitable material, supporting a cross-bar, B, provided with elbows C, which fit on the top of said pillars. Depending from the cross-bar B are hangers D, insulated from the cross-bar by suitable sleeves, E. On these hangers are supported cables F F', which cables are to be connected with any suitable source of electricity in such a manner that one forms the positive and the other the negative terminals. On these cables runs a car or cars, G, provided with boxes H H', in which run the axles I I', carrying the grooved wheels J J' J'' J''' and the band-wheels K K'. The band-wheels are connected with an electric motor, L, the driving-wheels G' of which are connected with the band-wheels K K' by the bands M M'. The wheels are preferably formed with insulating-disks N, of leather, rawhide, paper, or similar material, clasped between flanges O and to the rim P of the wheel by the flat ring Q. The flanges O are secured to the axle in any suitable manner, and the outer rim of the wheel is grooved, as shown, so as to insure its remaining on the cable.

At R R are shown buffers on the outer ends of rods S S, whose inner ends are provided with buffer-springs T.

The circuits in the system are as follows: The current, from a suitable source, is in communication with the two cables F and F', so that one forms the positive and the other the negative terminal of said source. The wheels J J' J'' J''', running on said cables, are in electrical connection by means of proper switches and electrical conductors with the positive and negative terminals of the motor L. Two of the wheels—say J and J''—are insulated from the shafts I I', while the other two wheels, J' and J''', are in electrical contact with their corresponding shafts by means of suitable conductor, J', being connected with the axle I, and J''' with I', so that one shaft is in contact with the positive and the other with the negative cable. From the shafts the current passes through the boxes H H', which in turn, by means of proper conductors, are to be connected to the motor-circuits.

The disks N of the wheels are preferably made of rawhide, which will allow the wheels to work smoother upon the cables by diminishing the vibrations produced by the moving parts.

It is evident that the insulation of the driving-wheels from their axles may be accomplished by other means, and that various devices may be used for suspending the cables.

It will be readily seen that by the above-described arrangement and construction a very convenient means for operating cable-supported cars is produced, which will be very useful in mining districts and elsewhere, and which can be even used for carrying passengers, if the parts are properly proportioned.

I am aware of the Patents Nos. 292,529 and 302,596, and make no claim to anything shown therein.

What I claim as new is—

1. In a system of suspended electrical conveyers, the combination, with two supporting-conductors and an electromotor traveling thereon, of two supporting-wheels running on said conductors, one of said wheels being in electrical connection with one pole of the motor and the other wheel with the other pole of the same, and each supporting-wheel having an axle running in a bearing arranged above the conductors and connected to and supporting a car below the same, substantially as described.

2. In a system of suspended electrical conveyers, the combination, with two supporting-conductors and an electromotor traveling thereon, of two wheels running on said conductors and supporting a car, one of said wheels being in electrical connection with one of the poles of the motor and the other with the other pole thereof, and carrying a car below the conductors by a connection passing between the same, substantially as described.

3. In a system of suspended electrical conveyers, the combination, with two supporting-conductors, of a car and a motor both suspended below and by said supporting-conductors, and axle carrying supporting and driving wheels, one of which acts as an electrical connection between the supporting-conductor and the motor, and intermediate connections, substantially as described, between the motor and the axle passing between the conductors for transferring motion from the motor to the axle, substantially as described.

4. In a system of suspended electrical conveyers, the combination of the uprights A, cross-bar B, the hangers D, the conductors supported on said hangers and insulated from the cross-bar, and the car G, hung below said conductors by standards passing between them, and carrying bearings for the supporting and driving axles.

5. In a system of electric cable conveyance, and in combination with the car and electric motor thereof, the posts A, the cross-bar B, the hangers D, insulating-sleeves E, and the cables F F', substantially as described.

In testimony whereof I affix my signature, in presence of two witnesses, this 20th day of February, 1885.

CHARLES J. VAN DEPOELE.

Witnesses:
AARON K. STILES,
WARREN S. STEARNS.